United States Patent
Ibarra

(10) Patent No.: US 10,813,001 B1
(45) Date of Patent: Oct. 20, 2020

(54) MULTICAST MESSAGING BASED ON DISTANCE ESTIMATION OF NETWORK DEVICES

(71) Applicant: Synapse Wireless, Inc., Huntsville, AL (US)

(72) Inventor: Eric Joseph Ibarra, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 77 days.

(21) Appl. No.: 16/012,641

(22) Filed: Jun. 19, 2018

(51) Int. Cl.
*H04W 28/02* (2009.01)
*H04W 4/06* (2009.01)
*H04B 17/27* (2015.01)
*H04W 40/22* (2009.01)
*H04W 84/18* (2009.01)

(52) U.S. Cl.
CPC ......... *H04W 28/021* (2013.01); *H04B 17/27* (2015.01); *H04W 4/06* (2013.01); *H04W 40/22* (2013.01); *H04W 84/18* (2013.01)

(58) Field of Classification Search
None
See application file for complete search history.

(56) References Cited

U.S. PATENT DOCUMENTS

| 7,852,820 | B2 | 12/2010 | Ewing et al. | |
|---|---|---|---|---|
| 8,081,590 | B2 | 10/2011 | Banks | |
| 10,049,552 | B1 | 8/2018 | Ewing et al. | |
| 2010/0019932 | A1* | 1/2010 | Goodwin | G08G 1/162 340/902 |
| 2013/0263231 | A1* | 10/2013 | Lautenschlager | H04L 63/0861 726/4 |
| 2016/0044447 | A1* | 2/2016 | Tetreault | G01K 1/024 455/41.1 |

* cited by examiner

*Primary Examiner* — Diane L Lo
(74) *Attorney, Agent, or Firm* — Maynard Cooper & Gale, P.C.; Jon E. Holland

(57) ABSTRACT

A wireless network has a transmitting node that can send a multicast message over the wireless network to a plurality of receiving nodes. Each of the receiving nodes, on receipt of the multicast message, can estimate, based on the receipt of the multicast message, a distance between the transmitting node and the receiving node. If the distance is within a certain distance range from the transmitting node, the receiving node implements a delay of a predetermined amount of time before retransmitting the message to its neighboring nodes. If the distance is beyond that range, the message is retransmitted without delay. All nodes within the distance range implement the same delay before retransmission, however, they may also implement an additional, randomized delay to allow nodes to transmit in several discrete time slots, thereby avoiding or minimizing data collisions with other nodes' transmissions of the message.

16 Claims, 4 Drawing Sheets

MULTICAST MESSAGING BASED ON DISTANCE ESTIMATION OF NETWORK DEVICES

RELATED ART

Wireless communication has grown in complexity as connectivity solutions demand increases in the mobility and functionality of devices. In one configuration, individual wireless devices are configured as a mesh network. Each node is capable of receiving, transmitting, and relaying traffic to one or multiple neighboring nodes, creating a topology in which there is generally more than one route between any two nodes. However, as the number of devices on a wireless network and their geographic diversity increases, there is a corresponding increase in network traffic. In such a configuration, transmission of data can become difficult to manage efficiently.

In one method, transmission between nodes in a mesh network can be managed via the maintenance of topological or routing tables that indicate designated routes for messages. Nodes can communicate among one another to learn of data paths for various destination nodes. Once a path to a particular destination node is discovered, the routing table(s) of the nodes along the path may be updated and later used to route a message to the destination. However, there is a transaction cost to this method, as the process of route discovery adds to network congestion. To avoid the overhead of creating and updating routing tables in a network with mobile nodes, a network may instead rely on multicast transmission, removing the need to find paths through the network. However, a multicast solution also contributes to network traffic. Depending on radio frequency (RF) channel availability, there are a limited number of packets that can be simultaneously transmitted wirelessly. Where there is a great deal of traffic on a wireless network, the probability of data collision increases.

Data collision occurs when a node in a wireless network attempts to transmit a message at the same time as another node. If the two nodes attempting simultaneous transmission are within range of each of other, and attempt to transmit at the same frequency, the transmissions may interfere, or "collide," with each other. In a network configuration with a higher probability of data collision, a transmission of data may take longer to reach its intended target (higher end-to-end latency) or data may be lost. This reduces network efficiency and may increase needed network resources.

Many techniques have been used to mitigate or reduce the probability of data collisions. For example, in some configurations, wireless nodes implement a listening period to determine whether any other packages are being sent ("listen-before-transmit"). In addition, a system may add a random delay to retransmissions of multicast messages. By slightly delaying transmission by different amounts of time at different nodes, dispersion of multicast messages can be spaced out chronologically. However, the efficiency of such solutions could be even further improved.

Further techniques for communicating efficiently and reliably to optimize wireless network performance are generally desired. The methods according to the present disclosure allow mobile and ad-hoc networks to reduce the probability of data collision in wireless communication between nodes in a network, without sacrificing network efficiency.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for reducing data collisions when propagating muticast messages in a wireless network. In one exemplary embodiment, a first node ("transmitting node") transmits a muticast message over a wireless mesh network to a plurality of receiving nodes that neighbor the transmitting node. Each receiving node has a receiver that receives the multicast message and control logic that estimates a distance between the transmitting node and the respective receiving node. The estimation of distance can be performed, for example, based on a received signal strength indicator value or a time of flight measurement. The receiving node retransmits, or forwards, the muticast message to its neighboring nodes in accordance with a timing derived from the estimation of the receiving node's distance from the transmitting node. Specifically, the receiving node delays retransmission of the message by a particular amount of time that corresponds inversely to the distance from the transmitting node. An amount of delay is assigned to respective groupings of the receiving nodes, where the receiving nodes have been grouped based on distance ranges from the transmitting node. Receiving nodes that are farther from the transmitting node are scheduled to retransmit the multicast message with less (or no) delay, while those gradually closer to the transmitting node have a gradually greater amount of delay before retransmission. This staggering of the transmission of the multicast message between nodes in the network, with priority given to nodes farther away from the transmitting node, reduces the probability of a data collision and speeds up the propagation of a message through the network.

Figure 1:
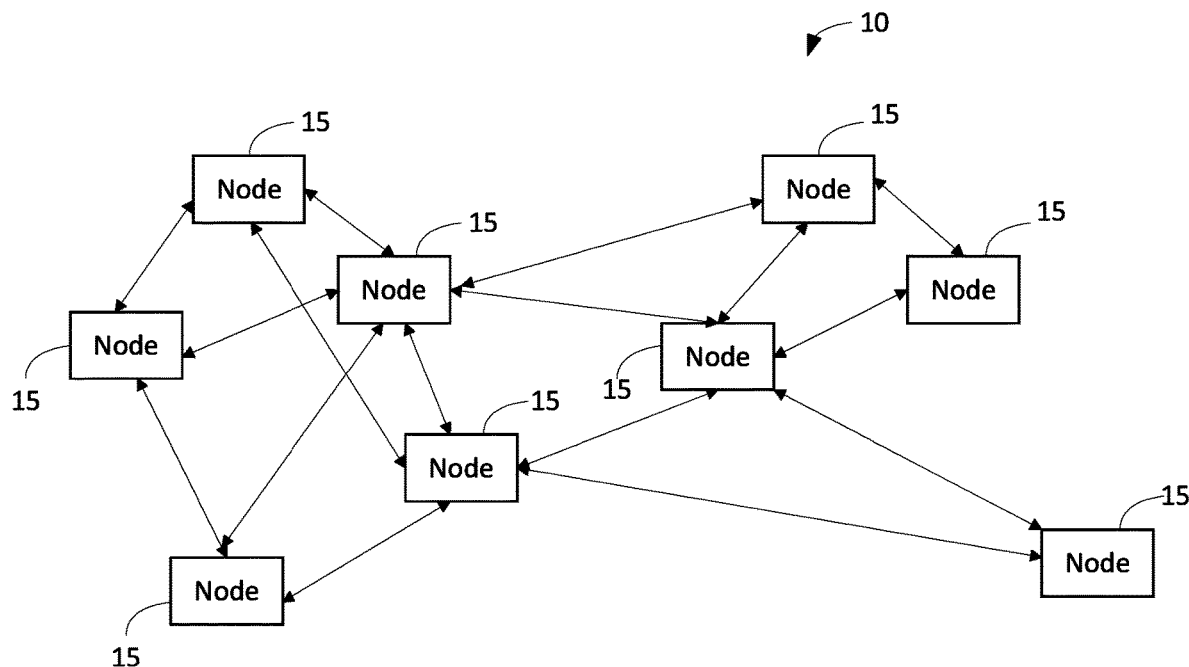
FIG. 1 is a block diagram illustrating an exemplary embodiment of a wireless network in accordance with the present disclosure.

FIG. 1 depicts an exemplary embodiment of a wireless network 10. As shown by FIG. 1, the network 10 has a plurality of nodes 15 that communicate with each other via wireless radio frequency (RF) signals according to a protocol defined for the network 10. The network 10 may have any number of nodes or may communicate in other frequency ranges. Each node 15 can be stationary (fixed in place) or can be mobile, such that it can be moved to a different physical location. In addition to wireless communication, any or all of the nodes may be coupled to one or more other nodes through a physical medium, such as a cable.

In an exemplary embodiment, the wireless nodes 15 may implement an ad hoc mesh network. Messages sent through the mesh network travel node-to-node until they reach their intended target destination. In practice, such an ad hoc network is topologically variable, as mobile nodes may move to a different location, additional nodes may be added, or nodes may become inaccessible. However, for illustrative purposes, with reference to FIG. 1, it can be assumed that any of the nodes 15 is only within wireless communication range of any of the nodes connected to it by an arrow, and can only communicate indirectly (through an intermediary) with a node not connected to it by an arrow. Because mesh networks generally have a plurality of paths to reach a given node, and because a network may topologically vary, a message sent between two nodes 15 can take different paths to reach its destination.

Figure 2:
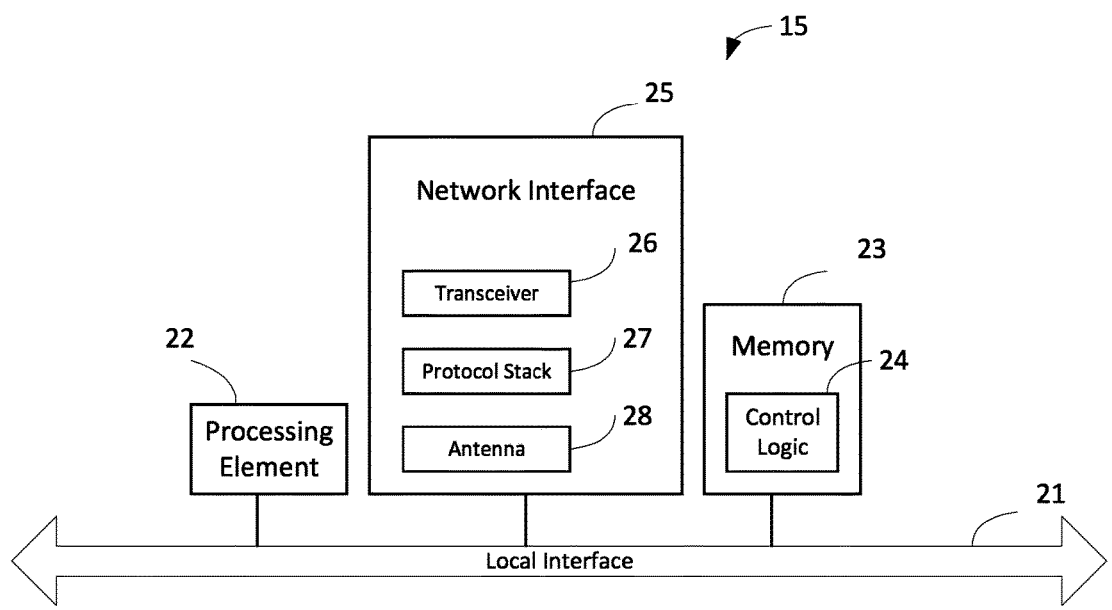
FIG. 2 is a block diagram illustrating an exemplary embodiment of a network node, such as is depicted by FIG. 1.

FIG. 2 depicts a node 15 in accordance with an exemplary embodiment of the present disclosure. The exemplary node 15 comprises at least one processing element 22, such as a central processing unit (CPU), digital signal processor, other specialized processor or combination of processors, or other circuitry that communicates to and drives the other elements within node 15 via a local interface 21 (for example, a bus). The node 15 has control logic 24 for generally controlling the operation of the node 15. The control logic 24 can be implemented in software, hardware, firmware, or any combination thereof. In the embodiment illustrated in FIG. 2, the control logic 24 is implemented in software and is stored in a memory 23. Various other data and code can also be written to or read from memory 23. Control logic 24, when implemented in software, can also be stored on any computer-readable medium, for example electronic, magnetic, or optical mediums, among others, or another system, apparatus, or device. The control logic 24 is implemented by a processing element 22, which comprises processing hardware (e.g., one or more processors) for executing instructions stored in the memory 23, or any other circuitry capable of executing the instructions of the control logic 24.

The node 15 also has a network interface 25 for enabling communication with other nodes over the network 10. In an exemplary embodiment, the interface 25 is configured to communicate wirelessly over one or more geographic areas, but the interface 25 may alternately or additionally exchange data via a physical medium. As shown by FIG. 2, the network interface 25 has at least an antenna 28, a transceiver 26, and a protocol stack 27. The stack 27 controls the communication of data between the network interface 25 and the other networked nodes. In the exemplary node 15, the stack 27 is implemented in software, however, it may also be implemented in hardware, software, firmware, or any combination thereof. When implemented in software, the stack 27 may be stored in the node 15's memory 23 or other computer-readable medium.

Figure 3:
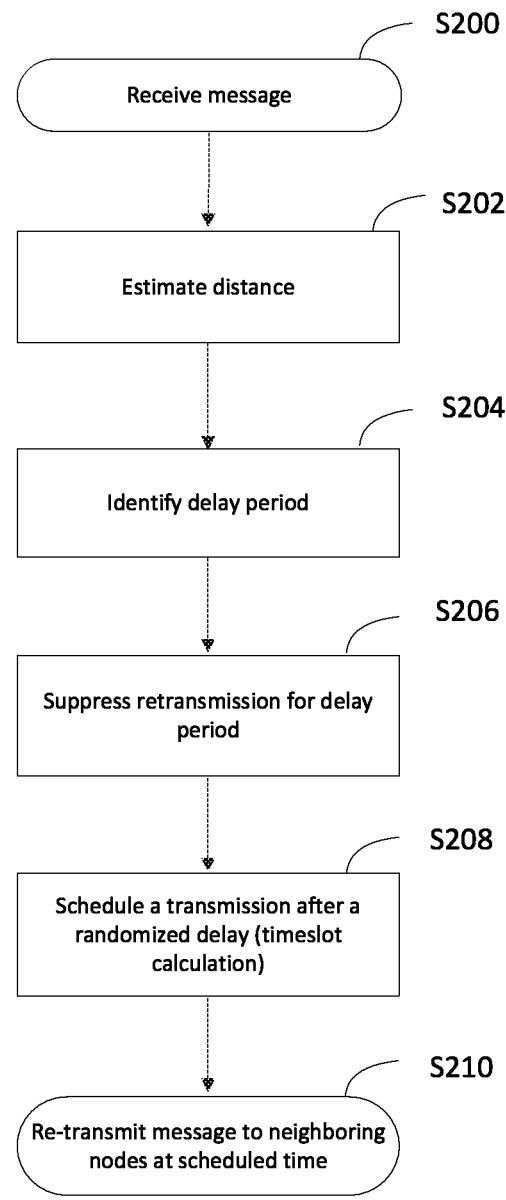
FIG. 3 is a flowchart depicting an exemplary method of retransmitting a multicast message, in accordance with an embodiment of the present disclosure.

FIG. 3 illustrates an exemplary method of transmitting multicast messages in a mesh network in accordance with the present invention. In the exemplary embodiment, the nodes 15 may be designed to communicate only multicast messages. A multicast message is a message intended to be sent to multiple nodes from a first (transmitting) node. Multicast messages do not follow a set path between nodes, but are gradually retransmitted (also referred to as "rebroadcasting" or "forwarding") by nodes that receive the message (receiving node). As a result, multicast communication removes the need to find paths through a network. Although this may increase the number of packets sent with relation to a single message, an embodiment sending only multicast messages can also significantly reduce congestion and data collisions since it is unnecessary for the nodes to communicate additional messages for discovering routes through the network. Because the transaction cost of route discovery and topological mapping is avoided, network congestion is ultimately reduced. For illustrative purposes, it will be assumed hereafter that the nodes of the network 10 communicate only multicast message unless otherwise indicated herein. However, should be noted herein that the network may be configured to also communicate unicast messages, and the techniques described herein for communicating multicast messages may be employed regardless of whether the network also communicates unicast messages.

A multicast message includes a header and a payload portion, the intended content data. Nodes 15 retransmit or broadcast the message through the network 10 based on the information in the message header. The header may include a time-to-live value, which is decremented every time the message is transmitted (a "hop") until it reaches zero or some set threshold, as which point the message is no longer retransmitted. Such practice eventually stops propagation of the multicast message so that it is not retransmitted in perpetuity. Alternatively, another manner of setting a finite time limit on the transmission period can be implemented. The header of the multicast message also typically contains a group identifier. Each node in a network may be provisioned so as to know which groups it is a member of. Upon processing a multicast message after receipt, a receiving node will be able to determine whether it is an intended group recipient.

Referring to FIG. 3, assume that a multicast message has been transmitted over the network 10 by a transmitting node to every node within a one hop distance from the transmitting node, including a first receiving node 15. In step S200, receiving node 15 receives that multicast message. In the exemplary embodiment, the multicast message has a non-zero time-to-live value, meaning it can be retransmitted at least one more time.

Next, in step S202 of the exemplary embodiment, control logic 24 of the node 15 estimates a distance between itself and the transmitting node that sent the multicast message. This estimation can be done in one of several ways. In an exemplary embodiment, a distance between the transmitting and receiving node is estimated on the basis of a received signal strength indicator (RSSI), a measurement of signal power in the received signal, or received channel power indicator (RCPI). Upon receipt of a multicast message, transceiver 26 (or another monitoring software stored in memory 23) measures the RSSI lower strength. Control logic 24 can use any known or developed path loss model or other appropriate mathematical model to compute an estimated distance based on the RSSI. It will be understood that a computation of distance based on the RSSI will be an estimation of distance rather than a precise localization of any networked device, and will be dependent on the environmental conditions of the indoor or outdoor space in which the nodes are located (e.g., objects, walls, reflections, weather, geographic conditions, or other multipath effects in the indoor space, among other things, could interfere with a signal and reduce the accuracy of the distance estimation.) Depending on these environmental conditions, the node 15 can be configured, at the time of the node's installation, to estimate distance from the RSSI based on a known empirical model or a customized algorithm. At a basic level, it will be understood that RSSI has an inverse relationship to distance from the transmitting node: a low RSSI (more fading of signal) implies that a receiving node is relatively far away from the transmitting node, while a high RSSI implies that the receiving node is relatively close to the transmitting node. Thus, if desired, the control logic 24 may use the RSSI itself as the distance estimate described above without converting it to a different value.

In step S204 of FIG. 3, the estimated distance from the transmitting node calculated in S202 is used to identify a delay period (generally in milliseconds) for which the retransmission of the multicast message by the node 15 should be suppressed. In one embodiment, control logic 24 contains an algorithm for calculating a delay period from the calculated distance. However, the appropriate delay period may also be pre-stored, in association with a calculated distance or range of distances, in a table or database (not shown) in memory 23 upon configuration/installation of the node 15.

Figure 4:
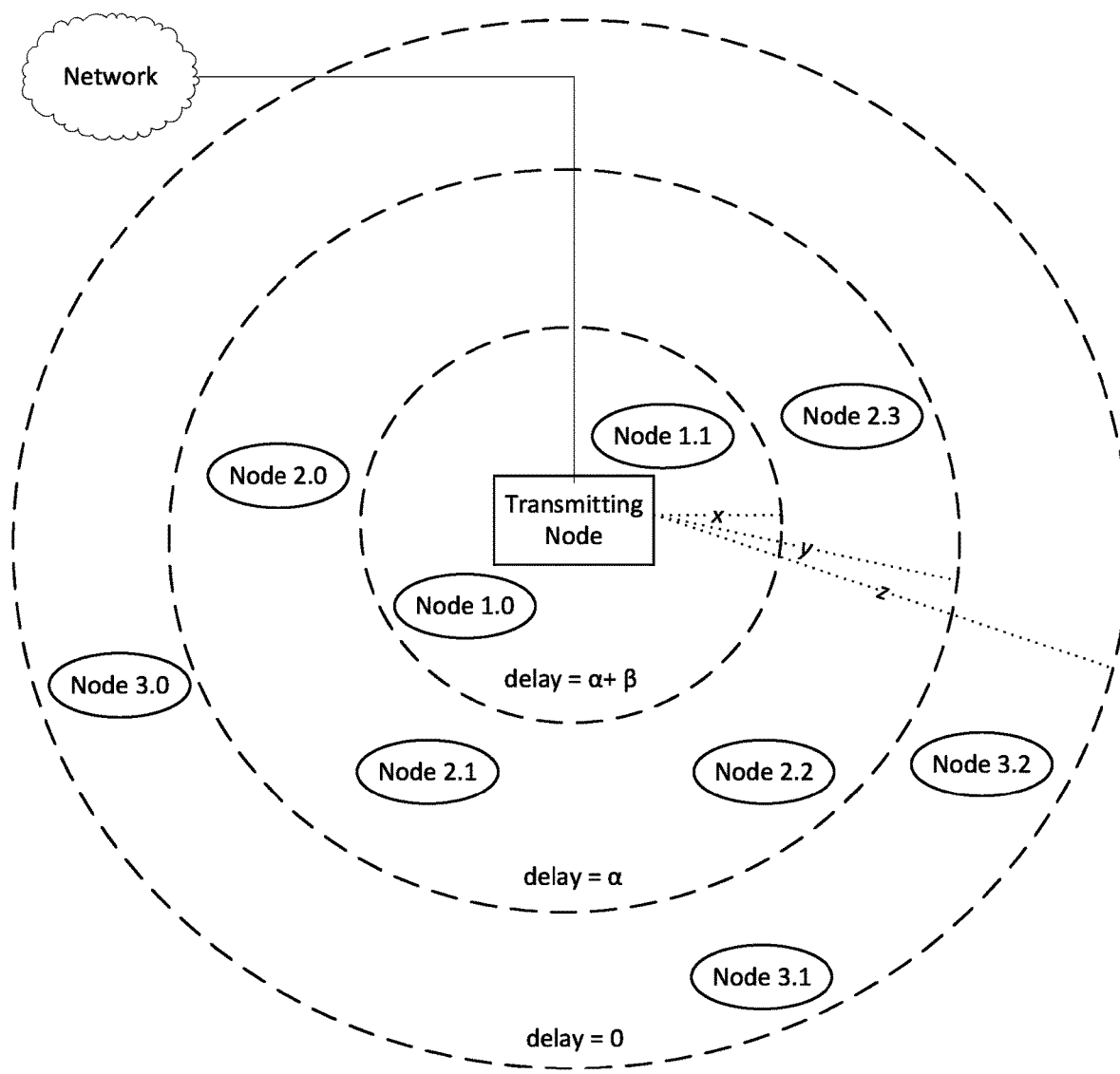
FIG. 4 is a diagram illustrating an example of a scheduling of packet retransmission in accordance with the present disclosure.

The identification of a delay period is illustrated in greater detail in FIG. 4. FIG. 4 illustrates a transmitting node 15 along with receiving nodes 15 (labeled as nodes 1.0-3.2), where each receiving node is one hop away from the transmitting node. That is, each receiving node 15 is within range of the transmitting node such that it receives the multicast message directly from the transmitting node. The receiving nodes sit at varying distances from the transmitting node. The control logic 24 of each receiving node estimates, based on a determination of RSSI as described above, what the node's distance from the transmitting node is and determines whether that estimated distance falls into a first, second, or third range, illustrated herein as concentric "rings" from the transmitting node. Rather than physical "rings," the illustrated rings instead identify a minimum and maximum radius of distance (a range of distance) from the transmitting node. Each receiving node 1.0-3.2 is grouped into one of several designated rings based on which distance range it falls into. As illustrated, Nodes 1.0-1.1 are located in a first range, within distance x of the transmitting node, receiving nodes 2.0-2.3 are within distance y of the transmitting node, where y>x, and receiving nodes 3.0-3.2 are within distance z of the transmitting node, where z>y>x. The scope of these ranges may be known in advance by the control logic 24, or may be calculated dynamically by the control logic 24 after the multicast message is received and the estimated distance are calculated. In the illustration of FIG. 4, two receiving nodes (nodes 1.0 and 1.1) have been grouped into the closest ring with the smallest radius of x, four receiving nodes 15 (nodes 2.0-2.3) have been grouped into the second, middle ring with a radius of y, and three receiving nodes 15 (nodes 3.0-3.2) have been grouped into the farthest ring with the largest radius of z. The illustrated grouping of the receiving nodes relies solely on the distance of the receiving nodes from the transmitting node, however, another possible grouping of the receiving nodes may take into consideration factors such as equal distribution of nodes between the groups and/or whether certain receiving nodes should for any reason be prioritized or deprioritized into a particular group, among other things. While FIG. 4 illustrates three ranges, or rings, from the central transmitting node, it will be understood that the present invention can implement any number of ranges as appropriate. Additionally, while the illustrated grouping displays concentric circular rings, it may also be possible for the grouping to result in non-circular ranges.

In the embodiment illustrated in FIG. 4, each ring is assigned a delay value as described below, where α and β are non-zero time values (in milliseconds). The innermost ring with radius x (which includes the set of nodes closest to the transmitting node) is assigned the highest delay value, while the outermost ring with radius z (which includes the set of nodes farther from the transmitting node) is assigned a delay value of zero. This is shown in Table 1.0, below:

TABLE 1.0

| Receiving Nodes | Ring (Outer Distance Radius) | Delay Value (ms) |
|---|---|---|
| 1.0, 1.1 | x | α + β |
| 2.0, 2.1, 2.2, 2.3 | y | α |
| 3.0, 3.1, 3.2 | z | 0 |

Tuning back to FIG. 3, step S206 is the suppression of retransmission of a multicast message by a receiving node 15 for the period of time associated with the ring in which the receiving node is located. During suppression, a node 15 remains quiet without sending any outgoing traffic. In the exemplary embodiment described in Table 1.0 and FIG. 4, retransmission from, for example, node 3.1 will be suppressed by a delay value of 0 ms (i.e., no delay will be imposed before retransmission of the multicast message), while retransmission from, for example node 1.1 will be suppressed by a delay of at least α+β ms (i.e., node 1.1 will wait for α+β ms before attempting retransmission of the multicast message). In other words, a longer delay for retransmission is imposed on the ring(s) of receiving nodes 15 located closer to the transmitting node than those located farther away. This can be understood as the assignment of transmission "windows" during which the nodes within that ring can transmit. Nodes in the outermost ring that are one hop away from the transmitting node (those with the greatest distance from the transmitting node) will have the least (or no) delay and will be in the first window to retransmit the multicast message received from the transmitting node.

Step S208 of the exemplary invention is the scheduling of a second, randomized delay for each retransmitting node within a particular transmission window, a collision avoidance technique. If all of the nodes within one transmission window attempt to receive, process, and retransmit the multicast message at same time, such as at the beginning of the transmission window, their actions may overlap each other, leading to a data collision. To counter this, a different transmission interval is assigned for each node retransmitting the message within the window. The protocol stack 27 of a receiving node 15 may calculate a randomized delay and add that delay to the period of suppression before retransmission. In the exemplary embodiment, all of the calculated randomized delays will be less than either of values α or β. The stack 27 may then schedule retransmission of the message after that randomized delay expires. To help avoid a data collision, the stack 27 calculates the delay interval and schedules the retransmission such that retransmissions by all of the nodes in such window is completed prior to the commencement of any retransmission by a node in a window corresponding to a distance closer to the transmitting node (if any).

Step S210 is retransmission of the multicast message. At the time a node 15 is scheduled for retransmission, the stack 27 will decrement the time-to-live value of the outgoing message and will forward the message to all of the nodes that are neighboring to node 15 in network 10, that is, all nodes within one hop of node 15. This retransmission is done after suppressing transmission for the period of time set by the first delay (in the exemplary embodiment, as set in Table 1.0, one of 0, α, or β) in step S206, and in accordance with the schedule set in step S208, which is based on the randomized delay interval (a random value less than α or β). As a result, each of the exemplary receiving nodes 1.0-3.3 shown in FIG. 4 is likely to transmit the multicast message in a time interval that is discrete from that of other nodes, thereby reducing data collisions. Because all of the scheduled randomized delays are less than the delays periods implemented by the different transmission windows (rings), all of the nodes within a given window will retransmit the multicast message in a random transmit interval before the first node of another window.

Figure 5:
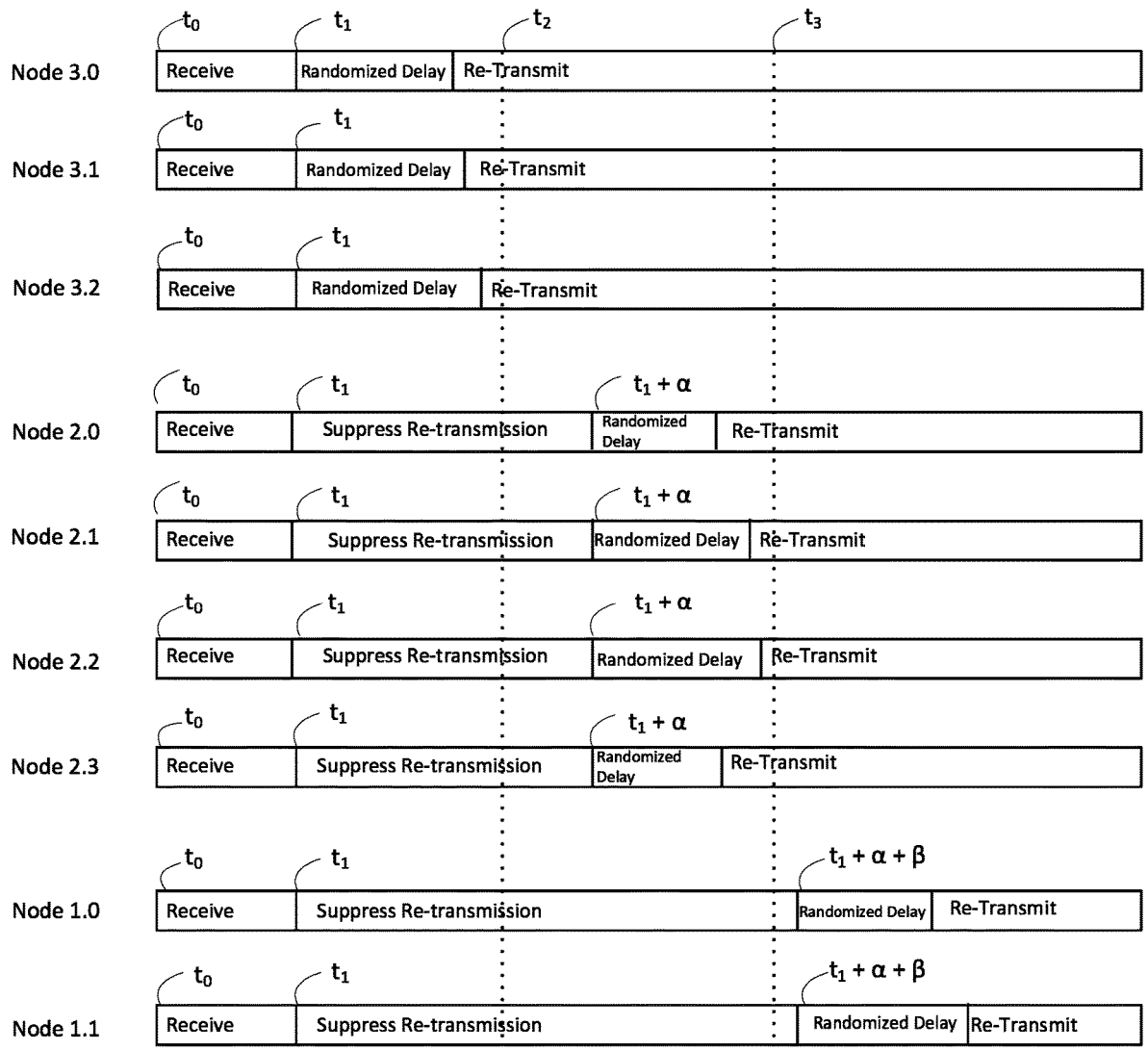
FIG. 5 is a timing diagram illustrating an example of a scheduling of packet retransmission in accordance with the present disclosure.

An exemplary use and operation of this scheduling of data transmissions is described below with particular reference to FIG. 5. In this regard, FIG. 5 depicts a typical timing diagram for delay and retransmission of a multicast message to each of the receiving nodes 1.0-3.3 illustrated in FIG. 4. At time $t_0$, assume for the sake illustration that all of the receiving nodes begin to receive a multicast message from the transmitting node, and at time $t_1$ the transmission ends. In practice, there will likely be slight differences in the time at which the nodes receive the multicast message based at least in part on their respective distances from the transmitting node, but such distances may be small relative to the durations of the transmission windows. Nodes 3.0, 3.1, and 3.2 are in the farthest ring from the transmitting node, and therefore are not obligated to suppress retransmission by any set amount of time. According, immediately upon receipt of the message, nodes 3.0, 3.1, and 3.2 schedule transmissions according to randomized delay intervals, and, after their respective randomized intervals, begin retransmission of the message. At time $t_2$ (after $t_1$), all of the nodes 3.0, 3.1, and 3.2—the nodes within the farthest ring from the transmitting node—are retransmitting or have retransmitted the message. At time $t_1+a$, nodes 2.0, 2.1, 2.2, and 2.3 (the middle ring) implement randomized delay intervals, and then, after their respective intervals, begin retransmission of the message. At time $t_0$ (after $t_1+\alpha$), all of the nodes 2.0, 2.1, 2.2, and 2.3 are retransmitting or have retransmitted the message. At time $t_1+\alpha+\beta$, nodes 1.0 and 1.1 (the closest ring) implement randomized delay intervals, and then, after their respective intervals, begin retransmission of the message. Note that while such is not illustrated in FIG. 5, the node 15 may also engage in other data processing prior to retransmission of the message.

In an alternative embodiment, instead of a randomized time interval, all of the nodes within a window will transmit according to a "listen before transmit" protocol, where stack 27 of node 15 listens to the surrounding network traffic and waits to transmit if another nearby node is in the process of transmitting. If another embodiment, the stack 27 may use both a randomized time interval and a "listen before transmit" protocol, and the stack 27 may use other collision avoidance techniques as desired.

As a result of the method shown in FIG. 3 and described above, receiving nodes that are farther away from a transmitting node are permitted to transmit to their neighboring nodes sooner than receiving nodes that are located closer to the transmitting node. This allows for a faster propagation of a multicast message over an expanded area of transmission. Specifically, receiving nodes that are farther from the transmitting node are more likely to reach a greater number of nodes that have yet to hear the multicast message relative to receiving nodes that are closer to the transmitting node, assuming that all of the receiving nodes have a similar transmission power. Since the nodes farther from the transmitting node are more likely to attempt retransmission earlier after reception of the multicast message, the multicast message is more likely to reach a greater number of nodes that have yet to hear the message sooner. In addition, staggered transmission timings also reduce the probability of data collisions, which further contributes to faster propagation of a message over the network. As an example, by delaying the retransmissions from receiving nodes closer to the transmitting nodes, the retransmissions by receiving nodes farther from the transmitting node, which as described above are likely to reach a greater number of nodes that have yet to hear the multicast message, are less likely to experience a data collision, further helping the multicast message to propagate through the network.

Second Embodiment

In another embodiment, rather than a dynamic calculation of an estimated distance based on an RSSI of the current message, an alternate method of distance estimation known or developed may be used. As a first example, the node 15 may store in its memory 23 a table (not shown) containing RSSI information from previously-received messages to node 15 from each other node within range, including the transmitting node. When the transceiver 26 receives a message from the transmitting node 15, the stack 27 may refer to the table to obtain a previously-determined RSSI and calculate an estimated distance instead of dynamically calculating an RSSI value and a distance based thereon. The process then proceeds as described above through steps S204-S210. After retransmission of the message at step S210, control logic 24 may update the table in memory with the RSSI of the latest received message from the transmitting node.

In another alternative, rather than RSSI, control logic 24 of a node 15 could estimate distance between nodes based on a time of flight, in which a time difference is measured between the emission of a signal and its detection by a sensor at a known distance or its return to a sensor after being reflected by an object, or, similarly, a silent echo generation. Where the network environment contains a number of static points at known distances, node 15 may also have the option of calculating a distance from another node through triangulation. A further variant, although not preferred, as such solutions may increase network traffic, is for stack 27 to estimate distance based on a packet propagation delay or a signal propagation time in which the time span is measured from the moment at which a packet starts to the travel to the moment at which the acknowledgement of the packet is received from the destination.

It will be understood that any of the foregoing methods, or any other known method for determining distance, can be used in combination with another, thereby cross-validating the accuracy of the distance estimation. However, while using multiple approaches may increase the confidence in the estimation, it may also increase the necessary packet processing performed by each node. Additional processing at each node may further delay transmission, increasing the end-to-end latency of the transmission.

This disclosure may be provided in other specific forms and embodiments without departing from the essential characteristics as described herein. The embodiments described are to be considered in all aspects as illustrative only and not restrictive in any manner.

Now, therefore, the following is claimed:
1. A wireless network comprising:
   a transmitting node configured to send a multicast message over the wireless network; and
   a plurality of receiving nodes, each being configured to:
   (a) receive the multicast message sent by the transmitting node,
   (b) estimate a distance between the transmitting node and the respective receiving node,
   (c) compare the estimated distance to a threshold value, (d) determine, based on a result of the comparing, that transmission of the multicast message should be delayed by a predetermined amount of time, and (e) transmit the multicast message to one or more nodes neighboring the respective receiving node only after a delay of the predetermined amount of time.

2. The wireless network of claim 1, wherein the distance between a first receiving node of the plurality of receiving nodes and the transmitting node is estimated to be greater than the distance between a second receiving node of the plurality of receiving nodes and the transmitting node; and wherein the first receiving node delays forwarding of the multicast message by a first delay and the second receiving node delays forwarding of the multicast message by a second delay that is longer than the first delay.

3. The wireless network of claim 1, wherein the estimation of distance is performed, by a receiver of a receiving node of the plurality of receiving nodes, based on one or more of: a received signal strength indicator value, a time of flight measurement, a packet propagation delay, or a triangulation measurement.

4. The wireless network of claim 1, wherein when the multicast message is received by a receiving node of the plurality of receiving nodes, the receiving node will (1) withhold forwarding of the multicast message for the delay of the predetermined amount of time, (2) withhold forwarding of the multicast message for an additional delay of a randomly generated second period of time, and (3) after the delay and the additional delay, forward the received multicast message to one or more nodes neighboring the receiving node.

5. The wireless network of claim 1, wherein the predetermined amount of time is determined by accessing a table, stored in a memory of the receiving node, to (a) identify which of a plurality of distance ranges encompasses the estimated distance, and (b) identify which of a plurality of time periods is associated with the identified distance range.

6. The wireless network of claim 1, wherein the predetermined amount of time is a value that is dynamically calculated by the receiving node based on the estimated distance.

7. A method of mitigating data collision during data transmission over a wireless network, the method comprising:

receiving, by a receiving node of the wireless network, a multicast message sent by a transmitting node of the wireless network;

measuring, by the receiving node, based on the receipt of the multicast message, a signal strength between the transmitting node and the receiving node;

determining, by the receiving node, based on the signal strength, a delay period by which to delay transmission of the multicast message from the receiving node; and transmitting, by the receiving node, the multicast message to a node that neighbors the receiving node, wherein the transmitting is performed after the expiration of the delay period.

8. The method of claim 7, wherein the determining includes (a) determining an estimated distance between the transmitting node and the receiving node, based on the measured signal strength, (b) accessing a table, stored in a memory of the receiving node, to determine a time interval associated with the estimated distance, and (c) using, as the delay period, the determined time interval.

9. The method of claim 7, wherein the delay period includes (a) a first time period determined in accordance with the measured signal strength and (b) a second time period determined in accordance with a calculation of a random time interval.

10. The method of claim 7, further comprising:

receiving, by a second receiving node of the wireless network, the multicast message sent by the transmitting node;

measuring, by the second receiving node, based on the receipt of the multicast message, a second signal strength between the transmitting node and the second receiving node; and determining, by the second receiving node, based on the second signal strength, a second delay period by which to delay transmission of the multicast message from the second receiving node, wherein the second signal strength between the transmitting node and the second receiving node is lower than the signal strength between the transmitting node and the receiving node, and wherein the second delay period determined by the second receiving node is less than the delay period determined by the receiving node.

11. A system comprising:

a transmitting node; and a receiving node connected to the transmitting node via a wireless network, wherein the receiving node is configured to:

(a) receive a multicast message sent by the transmitting node;

(b) measure, based on the receipt of the multicast message, a signal strength between the transmitting node and the receiving node;

(c) determine, based on the signal strength, a delay period by which to delay transmission of the multicast message from the receiving node; and (d) transmit, after the expiration of the delay period, the multicast message to a node that neighbors the receiving node.

12. The system of claim 11, wherein the receiving node determines the delay period by:

(a) determining an estimated distance between the transmitting node and the receiving node, based on the measured signal strength, (b) accessing a table, stored in a memory of the receiving node, to determine a time interval associated with the estimated distance, and (c) using, as the delay period, the determined time interval.

13. The system of claim 11, wherein the delay period includes (a) a first time period determined in accordance with the measured signal strength and (b) a second time period determined in accordance with a calculation of a random time interval.

14. The system of claim 11, further comprising:

a second receiving node of the wireless network, wherein the second receiving node is configured to:

(a) receive the multicast message sent by the transmitting node;

(b) measure, based on the receipt of the multicast message, a second signal strength between the transmitting node and the second receiving node; and (c) determine, based on the second signal strength, a second delay period by which to delay transmission of the multicast message from the second receiving node, wherein the second signal strength between the transmitting node and the second receiving node is lower than the signal strength between the transmitting node and the receiving node, and wherein the second delay period determined by the second receiving node is less than the delay period determined by the receiving node.

15. The system of claim 11, wherein the receiving node transmits the multicast message during a predetermined first window of time, and wherein the system further comprises a second receiving node of the wireless network, the second receiving node being configured to:

(a) receive the multicast message sent by the transmitting node;

(b) measure, based on the receipt of the multicast message, a second signal strength between the transmitting node and the second receiving node;

(c) determine, based on the second signal strength, whether to transmit the multicast message from the second receiving node during the first window of time or during a predetermined second window of time that does not overlap the first window of time, and (d) transmit the multicast message to a node that neighbors the second receiving node in accordance with the determination of whether to transmit the multicast message during the first window of time or the second window of time.

16. The system of claim 15, wherein a period of time between the first window of time and the second window of time is predetermined as to avoid collision of data during multicast transmission.

* * * * *